US010630889B1

(12) United States Patent
Stout (10) Patent No.: US 10,630,889 B1
(45) Date of Patent: Apr. 21, 2020

(54) AUTOMATIC CAMERA SETTINGS CONFIGURATION FOR IMAGE CAPTURE

(71) Applicant: North of You LLC, Bozeman, MT (US)

(72) Inventor: Ryan Stout, Bozeman, MT (US)

(73) Assignee: North of You LLC, Bozeman, MT (US)

( * ) Notice: Subject to any disclaimer, the term of this patent is extended or adjusted under 35 U.S.C. 154(b) by 0 days.

(21) Appl. No.: 16/283,726

(22) Filed: Feb. 22, 2019

Related U.S. Application Data (63) Continuation of application No. 15/840,818, filed on Dec. 13, 2017, now Pat. No. 10,270,962.

(51) Int. Cl.
| | | |
|---|---|---|
| *H04N 5/232* | (2006.01) | |
| *G06K 9/66* | (2006.01) | |
| *G06K 9/62* | (2006.01) | |
| *G06K 9/46* | (2006.01) | |
| *H04N 5/225* | (2006.01) | |

(52) U.S. Cl.
CPC ....... *H04N 5/23216* (2013.01); *G06K 9/4604* (2013.01); *G06K 9/6215* (2013.01); *G06K 9/66* (2013.01); *H04N 5/2252* (2013.01)

(58) Field of Classification Search
CPC ............. H04N 5/23216; H04N 5/2252; G06K 9/4604; G06K 9/66; G06K 9/6215
See application file for complete search history.

(56) References Cited

U.S. PATENT DOCUMENTS

| | | | | |
|---|---|---|---|---|
| 2008/0192129 | A1* | 8/2008 | Walker | ................. G11B 27/034 348/231.2 |
| 2011/0314049 | A1* | 12/2011 | Poirier | ............... H04N 1/00183 707/769 |

(Continued)

FOREIGN PATENT DOCUMENTS

| | | | |
|---|---|---|---|
| JP | 2015-228597 A | 12/2015 | |
| JP | 2015228597 | * 12/2015 | ............. H04N 5/225 |

(Continued)

OTHER PUBLICATIONS

Notice of Allowance dated Jan. 17, 2019 in related U.S. Appl. No. 15/840,818, 11 pages.

(Continued)

*Primary Examiner* — Nhan T Tran
(74) *Attorney, Agent, or Firm* — Pillsbury Winthrop Shaw Pittman LLP (57) ABSTRACT

In certain embodiments, a camera or camera accessory device may read, via a sensor, a test image related to an environment of the device, and the device may obtain a feature vector of the test image that indicates a set of features representing the test image. In some embodiments, the device may perform clustering of sets of camera settings based on the feature vector of the test image to determine clusters of camera settings sets. The device may select, from the clusters of camera settings sets, a cluster of camera settings sets based on scores related to the images similar to the test image. The device may determine environment-specific camera settings based on the cluster of camera settings sets and cause a camera adjustment based on the environment-specific camera settings.

18 Claims, 5 Drawing Sheets

(56) References Cited

U.S. PATENT DOCUMENTS

| | | | |
|---|---|---|---|
| 2014/0049652 A1* | 2/2014 | Moon | H04N 9/8233 |
| | | | 348/207.1 |
| 2015/0358537 A1 | 12/2015 | Mirza | |
| 2015/0363670 A1* | 12/2015 | Sugishita | H04N 7/181 |
| | | | 382/155 |
| 2015/0379373 A1 | 12/2015 | Bhatia et al. | |
| 2018/0041696 A1* | 2/2018 | Balasubramanian | |
| | | | H04N 5/23222 |
| 2018/0189532 A1* | 7/2018 | Bataller | G06K 7/10811 |
| 2018/0359411 A1* | 12/2018 | Kohstall | H04N 5/232 |

FOREIGN PATENT DOCUMENTS

| | | |
|---|---|---|
| KR | 10-2009-0072976 A | 7/2009 |
| KR | 10-2014-0007518 A | 1/2014 |

OTHER PUBLICATIONS

International Search Report and Written Opinion of the International Searching Authority dated Apr. 18, 2019 in related International Patent Application No. PCT/US2018/064932, 9 pages.

\* cited by examiner

AUTOMATIC CAMERA SETTINGS CONFIGURATION FOR IMAGE CAPTURE

RELATED APPLICATIONS

This application is a continuation of U.S. patent application Ser. No. 15/840,818, filed Dec. 13, 2017, the content of which is hereby incorporated herein by reference in its entirety.

FIELD OF THE INVENTION

The invention relates to device settings configuration for capturing data, including, for example, automatic device settings configuration for capture of audio, image, video, or other recordings.

BACKGROUND OF THE INVENTION

In recent years, most commercial cameras offer an automatic mode which, when enabled, allows the camera's software to fully control all settings used to take a photograph—from the focus to the aperture setting to the shutter speed. Although such automatic modes offered by typical commercial cameras will produce "acceptable" images, such automatic settings configurations of typical commercial cameras frequently capture less than desired photographs.

SUMMARY OF THE INVENTION

Aspects of the invention relate to methods, apparatuses, and/or systems for facilitating automatic camera settings configuration for image capture.

In some embodiments, a user device (e.g., being or otherwise including a camera, a camera accessory, etc.) may store (i) a neural network trained on 10,000 or more images that collectively are associated with 100 or more image categories and (ii) a collection of 1000 or more feature vectors of images, 1000 or more sets of camera settings, and 1000 or more scores related to camera settings sets. To automatically configure camera settings for the camera to take a shot, the user device may (i) obtain a test image and provide the test image to the neural network to obtain a feature vector of the test image, (ii) determine a set of similar images based on the feature vector of the test image and feature vectors of images of the set of similar images, (iii) perform clustering of sets of camera settings stored on the user device to determine clusters of camera settings sets, where each set of the sets of camera settings is associated with one of the images of the set of similar images, (iv) select, from the clusters of camera settings sets, a cluster of camera settings sets based on scores related to the similar images that are associated with camera settings sets of the cluster; (v) determine environment-specific camera settings based on the cluster of camera settings sets; and (vi) cause an adjustment of the camera by configuring the camera to reflect the environment-specific camera settings.

Various other aspects, features, and advantages of the invention will be apparent through the detailed description of the invention and the drawings attached hereto. It is also to be understood that both the foregoing general description and the following detailed description are exemplary and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
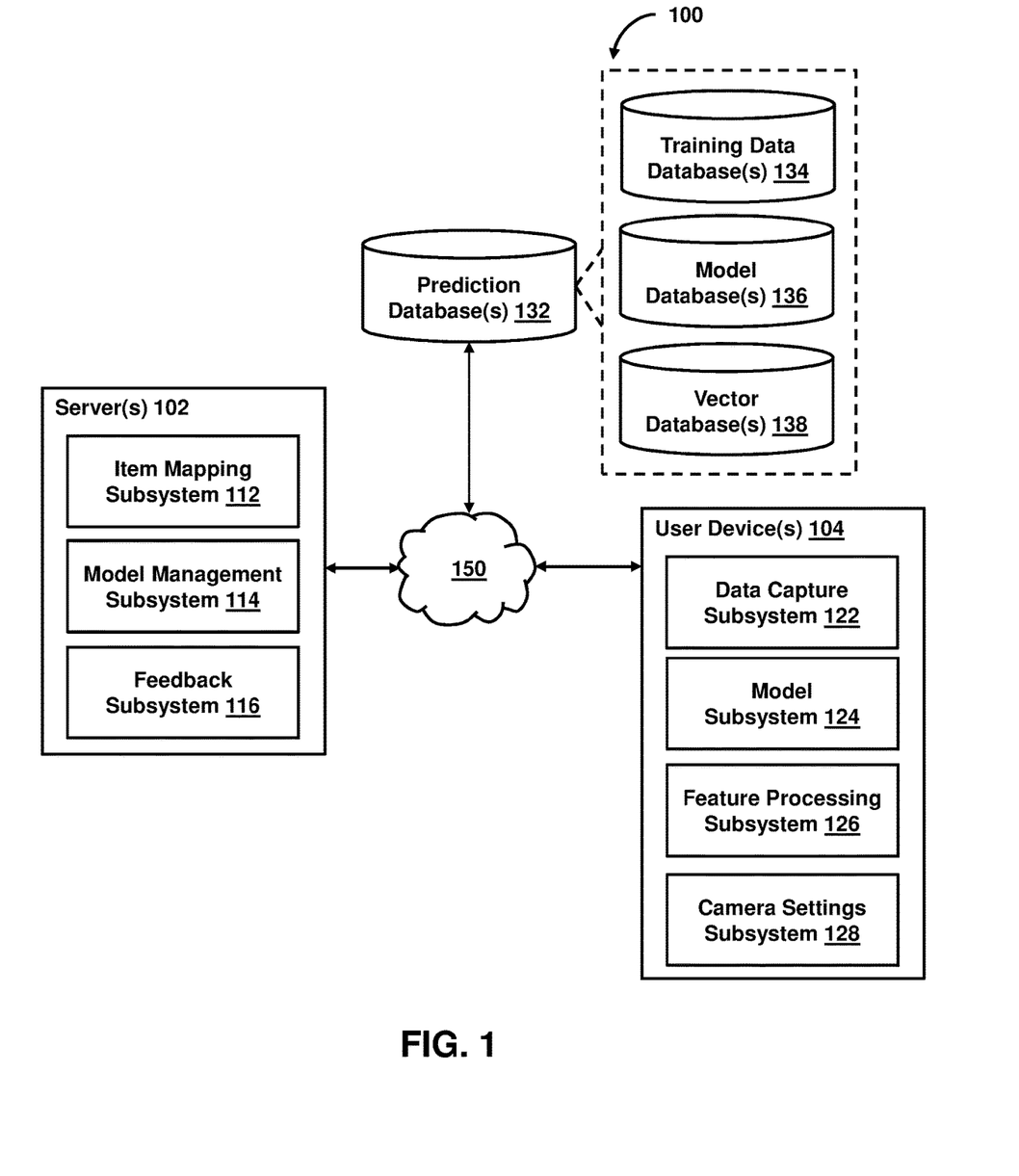
FIG. 1 shows a system for facilitating device settings configuration for capturing data, in accordance with one or more embodiments.

FIG. 1 shows a system 100 for facilitating device settings configuration for capturing data, in accordance with one or more embodiments. As shown in FIG. 1, system 100 may include server(s) 102, user device(s) 104, or other components. Server 102 may include item mapping subsystem 112, model management subsystem 114, feedback subsystem 116, or other components. User device 104 may include data capture subsystem 122, model subsystem 124, feature processing subsystem 126, camera settings subsystem 128, or other components. Each user device 104 may include any type of mobile terminal, fixed terminal, or other device. By way of example, user device 104 may include a desktop computer, a notebook computer, a tablet computer, a smartphone, a wearable device, a camera or other capture device, an accessory device to one or more of the foregoing, or other user device. Users may, for instance, utilize one or more user devices 104 to interact with one another, one or more servers, or other components of system 100. It should be noted that, while one or more operations are described herein as being performed by particular components of server 102 or user device 104, those operations may, in some embodiments, be performed by other components of server 102 or user device 104 or other components of system 100. As an example, while one or more operations are described herein as being performed by components of server 102, those operations may, in some embodiments, be performed by components of user device 104. As another example, while one or more operations are described herein as being performed by components of user device 104, those operations may, in some embodiments, be performed by components of server 102.

Device Settings Configuration for Capturing Data

In some embodiments, system 100 may perform an adjustment of a capture device (e.g., a camera or other audio, image, video, or data recorder) or suggest such adjustment to a user based on device settings determined with respect to an environment (e.g., of the capture device, an accessory to the capture device, a user of the capture device or the accessory, etc.). As an example, system 100 may adjust the capture device to match the determined device settings (e.g., such that the capture device's settings reflect the determined device settings). Device settings may include ISO settings, shutter speed settings, aperture settings (e.g., measured in f-stops), exposure compensation settings, depth of field settings, white balance settings, autofocus settings, auto exposure lock settings, metering settings (e.g., multi-zone metering, center-weight average, spot and partial metering, etc.), noise reduction settings, file format settings (e.g., raw, jpg, tiff, or other file format), or other device settings. In some embodiments, system 100 may automatically perform capture device adjustments or provide adjustment suggestions (i) on a periodic basis (e.g., every 10 nanoseconds, every 100 nanoseconds, every millisecond, every 10 milliseconds, every 100 milliseconds, or other time interval), (ii) in accordance with a schedule, or (iii) based on one or more automated triggers. As an example, capture device adjustment may be performed (or adjustment suggestions may be provided) in response to (i) detection of the capture device or accessory to the capture device being powered on or being switched to an active capturing mode, (ii) detection of a user input associated with a capture command such that the a capture device adjustment is performed prior to the user-intended data capture, (iii) detection of the capture device's movement (or the accessory's movement) satisfying a predetermined movement threshold (e.g., no detectable movement, at or below the predetermined movement threshold, etc.), (iv) detection of increase or decrease of acceleration of the capture device or the accessory satisfying a predetermined increase/decrease acceleration threshold (e.g., detecting sudden increase or decrease in such acceleration), or (v) other automated triggers.

In some embodiments, user device 104 (e.g., a capture device, an accessory to the capture device, or other user device) may store on its memory or its other local computer-readable storage one or more of (i) a collection of content items (e.g., high-quality photos from many genres of photography or other content items), (ii) the feature vectors of the content items (or other representations of the content items), (iii) device settings associated with the content items (e.g., capture settings used to capture the audio, images, videos, etc.), (iv) scores associated with the content items (e.g., photo or content quality rating scores generated based on user votes or ratings on a photo/content sharing site or other service, quality rating scores generated by one or more neural networks or other prediction models, etc.), or (v) other information. In this way, for example, user device 104 may have immediate access to the foregoing information to perform an adjustment of the capture device (e.g., a camera or other audio, image, video, or data recorder) or suggest such adjustment to a user based on device settings determined with respect to an environment without having to connect to the Internet or to one or more remote services (e.g., each time an adjustment is to be performed for a capture device). In some embodiments, server 102 may additionally or alternatively store on its databases or other computer-readable storage remote from user device 104 at least some of (i) the collection of content items, (ii) the feature vectors of the content items (or other representations of the content items), (iii) the device settings associated with the content items, (iv) the scores associated with the content items, or (v) other information.

In some embodiments, system 100 may employ one or more prediction models to perform an adjustment of a capture device or suggest such adjustment to a user. As an example, one or more prediction models may be used to (i) generate feature vectors or other representations of audio, images, or videos, (ii) map such audio, images, or videos to one or more vector spaces (e.g., via their corresponding feature vectors), (iii) obtain or process such feature vectors or other representations (e.g., to identify which of the audio, images, or videos are similar to a given content item, include a given object or concept, or correspond to a given category), or perform other operations related to adjusting a capture device or suggesting such adjustment. The prediction models may include neural networks, other machine learning models, or other prediction models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function that combines the values of all its inputs together. In some embodiments, each connection (or the neural unit itself) may have a threshold function such that the signal must surpass the threshold before it is allowed to propagate to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free flowing, with connections interacting in a more chaotic and complex fashion.

In some embodiments, system 100 may facilitate capturing of data (e.g., by a capture device, an accessory to the capture device, or other device) that can be used to perform an adjustment of the capture device. In some embodiments, system 100 may automatically facilitate capturing of such data (i) on a periodic basis (e.g., every 10 nanoseconds, every 100 nanoseconds, every millisecond, every 10 milliseconds, every 100 milliseconds, or other time interval), (ii) in accordance with a schedule, or (iii) based on one or more automated triggers. As an example, such capturing of data may be performed in response to (i) detection of the capture device or accessory to the capture device being powered on or being switched to an active capturing mode, (ii) detection of a user input associated with a capture command such that the a capture device adjustment is performed prior to the user-intended data capture, (iii) detection of the capture device's movement (or the accessory's movement) satisfying a predetermined movement threshold, (iv) detection of increase or decrease of acceleration of the capture device or the accessory satisfying a predetermined increase/decrease acceleration threshold, or (v) other automated triggers.

Figure 2:
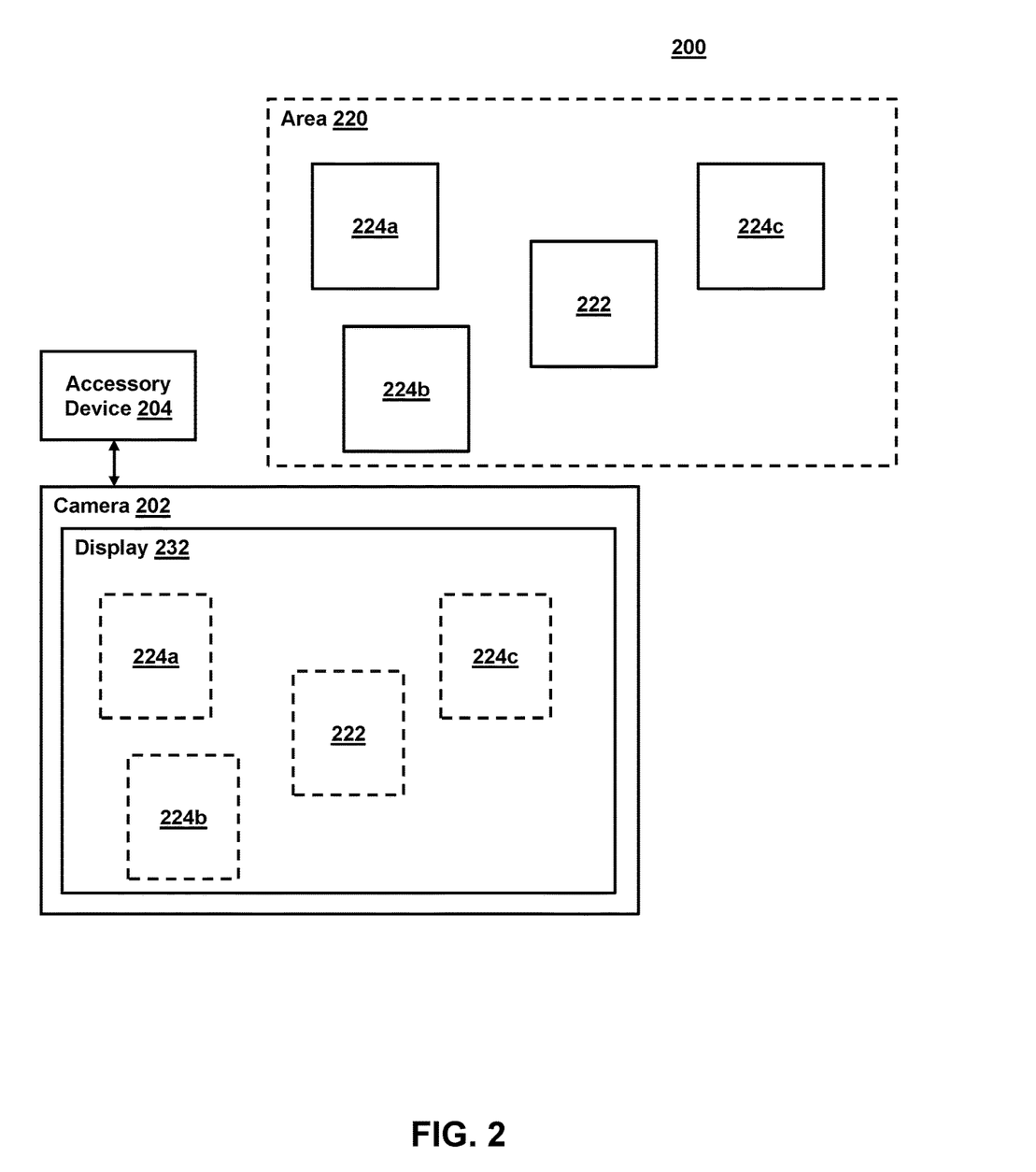
FIG. 2 shows an environment and a camera (in the environment) for which camera settings configuration is facilitated, in accordance with one or more embodiments.

In some embodiments, clustering may be performed on a collection of data to determine one or more data clusters, and data of at least one of the data clusters (e.g., device settings or other data associated with such data) may be used to perform an adjustment of a capture device or suggest such adjustment to a user. Such clustering may be performed via one or more clustering techniques, including K-means, affinity propagation, mean shift, spectral clustering, or other techniques. In some embodiments, with respect to FIG. 2, environment 200 (e.g., in a geographical location) may include a camera 202 and its accessory device 204 in communication with the camera (e.g., via a wired connection, a wireless connection, etc.). One or more test images may be captured by camera 202, accessory device 204, or other device (i) on a periodic basis, (ii) in accordance with a schedule, or (iii) based on one or more automated triggers. When camera 202 is focused on area 220 of environment 200 (that includes objects or concepts 222 and 224), a corresponding image (or image stream) may be presented on display 232 of camera 202. Accessory device 204 may use the corresponding image as a test image or use a test image (that is similar to the corresponding image) obtained via its sensor(s) to generate an image representation of the test image. Clustering of a collection of camera settings sets (e.g., associated with images similar to the test image) may be performed to determine one or more clusters of camera settings sets, where each set of the camera settings sets are associated with an image similar to the test image. Camera settings of at least one of the clusters may be used to perform an adjustment of camera 202. As an example, such camera adjustments may be performed in response to one or more triggers described herein with respect to capturing of test images (or other data). It should be noted that, while one or more operations are described herein with respect to images and cameras, those operations may, in some embodiments, be performed on other data (e.g., audio, video, etc.) to facilitate adjustment of settings for other devices (e.g., other audio, image, video, or data recorders).

Figure 3A:
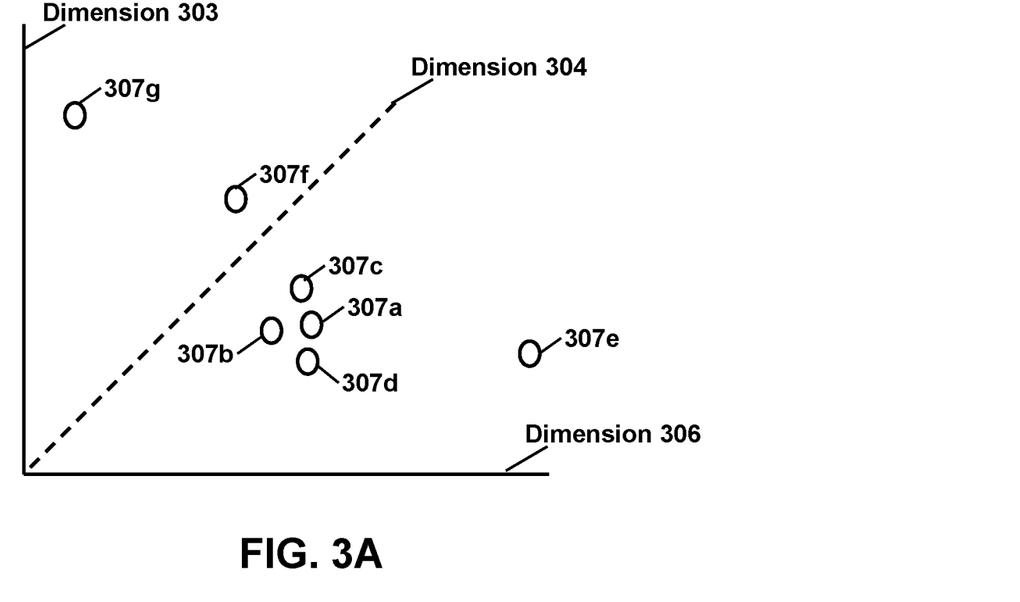
FIGS. 3A-3B show representations of a vector space and dimensions of the vector space, in accordance with one or more embodiments.
Figure 3B:
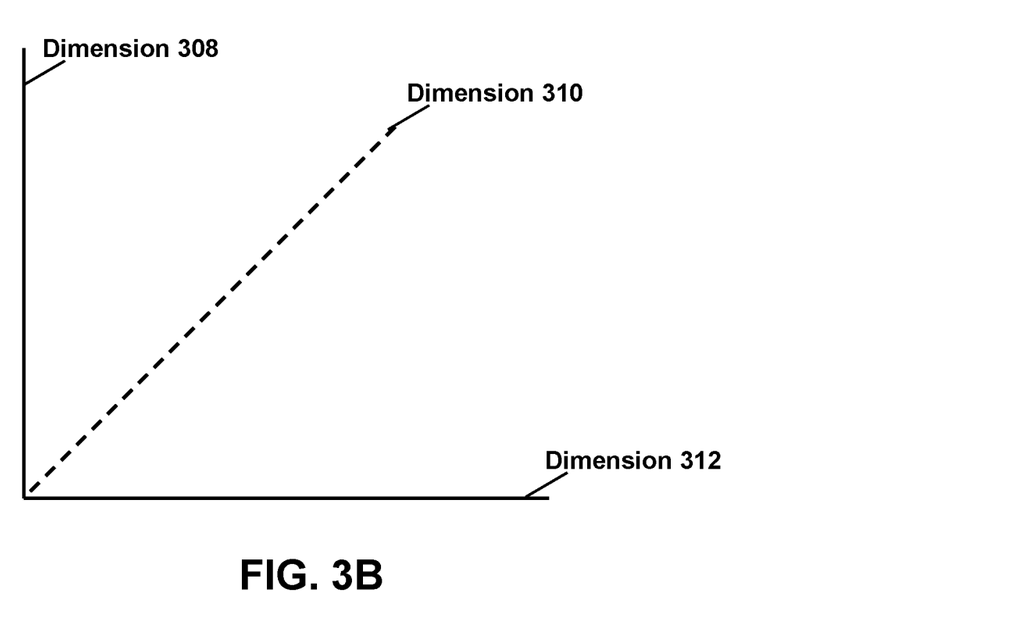

In some embodiments, audio/image/video representations of audio, images, or videos may include feature vectors of the audio, images, or videos. As an example, a feature vector is an n-dimensional vector of numerical features that represent some object (e.g., an image, an audio, a video, other content item, or other object), where a feature is a piece of information which is relevant for solving the computational task related to a certain application. In one use case, when representing an image, the feature values may correspond to the pixels of the image, specific shapes or structures in the image (e.g., points, edges, objects, shapes defined in terms of curves or boundaries between different image regions, etc.). In some embodiments, system 100 may map the audio, images, or videos (or other data) to one or more vector spaces via their corresponding feature vectors. In some embodiments, the vector space may be a high-dimensional vector space. As an example, the vector space may include 10 or more dimensions, 20 or more dimensions, 30 or more dimensions, 40 or more dimensions, 50 or more dimensions, 100 or more dimensions, 200 or more dimensions, 300 or more dimensions, 400 or more dimensions, 500 or more dimensions, 1000 or more dimensions, 5000 or more dimensions, 10000 or more dimensions, 100000 or more dimensions, or other number of dimensions. As an example, FIGS. 3A and 3B may show a representation of six dimensions (e.g., dimensions 303-312) of a vector space (which may have many more dimensions) on which at least some aspects of a content item may be mapped. In some embodiments, a single vector may be generated for each input content, and the input content may be mapped to the vector space based on the single vector (e.g., a vector of N or less number of dimensions may be generated to represent the input content for a N-dimensional vector space). In some embodiments, multiple vectors may be generated for each input content, and the input content (or its corresponding portions) may be mapped to the vector space based on the multiple vectors.

In some embodiments, data capture subsystem 122 may obtain one or more images (or an image or video stream), which may be used as "test" images to determine device settings for a camera (or other capture device) or perform adjustment of the camera (or other capture device) based on the device settings. As an example, with respect to FIG. 2, accessory device 204 (or camera 202) may include data capture subsystem 122, which may obtain a test image of area 220 of environment 200 via a sensor of accessory device 204 (or camera 202). As indicated, in some embodiments, data capture subsystem 122 may obtain such images (i) on a periodic basis, (ii) in accordance with a schedule, or (iii) based on one or more automated triggers. As an example, with respect to FIG. 2, the test image of area 220 of environment 200 may be obtained within less than a few seconds of a user input associated with an image capture command (e.g., less than one second, less than two seconds, less than three seconds, etc., of the user input).

In some embodiments, an image representation of an image related to an environment (e.g., of a camera, a camera accessory device, or other device) may be obtained, and the image representation may be used to determine device settings for a camera (or other capture device) or perform adjustment of the camera (or other capture device). As an example, the image representation may include a set of features representing the image related to the environment. The image representation may include a feature vector (or other image representation) that indicates the set of features representing the image related to the environment. In some embodiments, model management subsystem 114 may provide the image to a neural network or other prediction model to obtain (as an output of the neural network or other prediction model) the image representation (e.g., a feature vector representing the image). In some embodiments, the neural network (or other prediction model) may be trained on 1,000 or more images, 10,000 or more images, 100,000 or more images, 1,000,000 or more images, or other number of images (e.g., as described herein). The training images may collectively be associated with 10 or more image categories, 100 or more image categories, 1,000 or more image categories, 10,000 or more image categories, or other number of image categories.

In some embodiments, with respect to a test image, feature processing subsystem 126 may identify a set of image representations of images similar to the test image (or identify the images) based on the image representation of the test image, and then perform clustering on camera settings sets associated with the image representations (or the images similar to the test image) to determine one or more clusters of camera settings sets. Given that the camera settings sets (on which the clustering was performed) are associated with images similar to the test image, each of the determined clusters may include sets of camera settings associated with images similar to the test image. In one use case, with respect to identifying the similar images (to determine their associated sets of camera settings), feature processing subsystem 126 may use features indicated by the image representation as parameters to perform a nearest neighbor algorithm (or other technique) with respect to a large collection of images or their image representations (e.g., stored at a camera, at an accessory of the camera, or at one or more other storages of system 100) to determine the set of image representations of images similar to the test image. In another use case, where the large collection of image representations are stored as feature vectors in a vector space, feature processing subsystem 126 may determine one or more locations of the vector space that correspond to features of a feature vector representing the test image, and identify the images or their image representations mapped to locations of the vector space that are within a predetermined distance threshold of the corresponding locations (that correspond the test image) to determine the set of image representations of images similar to the test image. In one use case, with respect to FIG. 3A, a location of a vector space (e.g., at least partially represented by dimensions 303, 304, and 306) between locations 307*a*-307*d* may be predicted to be a location at or proximate to locations at which images (or their image representations) similar to the test image are mapped. As such, feature processing subsystem 126 may determine that locations 307*a*-307*d* are within the predetermined distance threshold from the predicted location, and, thus, may return information regarding the images (or their image representations) mapped to locations 307*a*-307*d* to respond to a request for images/image representations similar to the test image.

In some embodiments, where more than one cluster is derived from the performance one or more clustering algorithms on camera settings sets, feature processing subsystem 126 may select at least one cluster from the derived clusters and use information related to the selected cluster to determine device settings for a camera (or other capture device) or perform adjustment of the camera (or other capture device) based on the device settings. In some embodiments, feature processing subsystem 126 may select a cluster from such derived clusters based on scores related to a similar image (to which the selected cluster is associated), scores related to other similar images (to which other clusters are associated), or other criteria. In some embodiments, with respect to a selected cluster, camera settings subsystem 128 may determine camera settings based on the cluster of camera settings sets and cause an adjustment of the camera based on the determined camera settings (e.g., within less than one second of the determination of the camera settings, within less than a few seconds of the determination of the camera settings, etc.).

As an example, with respect to selection based on scores, feature processing subsystem 126 may select a cluster from among a plurality of clusters based on a determination that the combined scores or average score(s) of the selected cluster are higher than (or at least as high as) the combined scores or average score(s) of all other clusters of the plurality of clusters. As another example, feature processing subsystem 126 may select a cluster from among a plurality of clusters based on a determination that the combined scores or average score(s) of the selected cluster are higher than (or at least as high as) as least a predetermined threshold number (e.g., a threshold percentage, a threshold quantity, etc.) of the combined scores or average score(s) of other clusters of the plurality of clusters. The scores may include photo or content quality rating scores generated based on user votes or ratings on a photo/content sharing site or other service, quality rating scores generated by one or more neural networks or other prediction models, or other scores. In one use case, user ratings on image quality (e.g., 100 or more ratings, 1000 or more ratings, etc.) may be collected for each image (corresponding to an image representation), and those user ratings may be used as parameters to calculate one or more quality rating scores for the image (or the corresponding image representation). As an example, a quality rating score for an image may calculated by (i) averaging the user ratings collected for the image, (ii) determining which of the user ratings collected for the image are outliers and removing such outliers prior to averaging the user ratings or otherwise using the user ratings to calculate the quality rating score, (iii) assigning weights to the user ratings collected for the image and applying the assigned weights to calculate the quality rating score, or (iv) performing other operations.

As an example, with respect to camera settings sets, camera settings subsystem 128 may obtain camera settings sets from one or more computer-readable media of a camera or camera accessory device (or other user device on which camera settings subsystem 128 resides). As another example, camera settings subsystem 128 may obtain at least some of the camera settings sets from one or more sources remote from the camera or camera accessory device (or other user device on which camera settings subsystem 128 resides). As another example, a set of camera settings includes camera settings that were used to capture the image (e.g., represented by the associated image representation), camera settings predicted by one or more neural networks or prediction models (e.g., as an approximate of the actual camera settings used to capture the image), or other camera settings. Such camera settings may include ISO settings, shutter speed settings, aperture settings, exposure compensation settings, depth of field settings, white balance settings, autofocus settings, auto exposure lock settings, metering settings, noise reduction settings, file format settings, or other settings.

In some embodiments, camera settings subsystem 128 may obtain camera settings sets from one or more sources. To determine a camera settings of a given type, camera settings subsystem 128 may (i) determine an average of the camera settings (of the cluster of camera settings sets that correspond to the given type), (ii) determine which of the camera settings are outliers and remove such outliers prior to averaging the camera settings, (iii) assign weights to the camera settings and applying the assigned weights to determine the camera settings of the given type for the environment, or perform other operations to determine the camera settings of the given type for the environment.

In some embodiments, camera settings subsystem 128 may determine camera settings based on (i) information regarding one or more conditions, (ii) one or more camera settings sets, or (iii) other information. In some embodiments, camera settings subsystem 128 may determine camera settings for the environment by determining "base settings" (e.g., based on one or more sets of camera settings or other information) and using the base settings and the condition information to determine the camera settings. Such condition information may include (i) an amount of vibration having an effect on a camera, (ii) an amount of motion of a subject (e.g., of an image to be captured), (iii) a dynamic range of a test image, (iv) a color range of a test image, (v) a depth of field of a test image, (vi) a noise profile, (vii) a lens sharpness profile, (viii) a circle of confusion, or (ix) other information. In this way, for example, the camera settings may reflect one or more differences in conditions in the environment. In some embodiments, such condition information may be obtained near the moment a shot is taken by the camera. As indicated, for example, such condition information may be obtained (i) on a periodic basis (e.g., every 10 nanoseconds, every 100 nanoseconds, every millisecond, every 10 milliseconds, every 100 milliseconds, or other time interval), (ii) in accordance with a schedule, or (iii) based on one or more automated triggers (e.g., detection of a user input corresponding to a capture command or other automated triggers described herein).

In some embodiments, camera settings subsystem 128 may obtain sensor output signals from an accelerometer or other sensor (e.g., of a camera, a camera accessory device, or other device) and determine an amount of vibration having an effect on the camera, the camera accessory device, or other device based on the sensor output signals. In some embodiments, camera settings subsystem 128 may increase a shutter speed (e.g., a minimum shutter speed or the actual shutter speed used to capture a given image) or other setting of the camera in response to detecting an amount of vibration greater than a predetermined vibration threshold (e.g., to prevent blur or other negative effects). In some embodiments, such increase of the shutter speed (or other setting) may be proportional (e.g., relatively proportional) to the amount of detected vibration. In some embodiments, other information (e.g., focal length of the lens pulled from an application program interface associated with the camera) may be utilized to determine the shutter speed of the camera for capturing an image or other data.

In some embodiments, camera settings subsystem 128 may obtain one or more images (e.g., test images near the time a shot is taken) and detect a subject (e.g., of an image to be captured) in the obtained images. Camera settings subsystem 128 may then determine an amount of motion of the subject based on the obtained images. As an example, before a shot is taken by a camera, camera settings subsystem 128 pulls a series of frames from a sensor (e.g., of the camera, an accessory to the camera, or other device) and uses an optical flow algorithm to compute the optical flow between the frames, thereby providing an amount of apparent motion between frames. Using the time between frame grabs, camera settings subsystem 128 computes a minimum shutter speed (or other shutter speed or other setting) needed to freeze the motion of the subject (e.g., where freezing the subject requires making the amount of motion during the duration of the shutter less than 1 pixel, less than 2 pixels, etc.).

In some embodiments, camera settings subsystem 128 may obtain one or more images (e.g., test images near the time a shot is taken) and determine a dynamic range based on the images. As an example, camera settings subsystem 128 may convert a test image taken with a camera to grayscale and apply a gamma correction to the grayscale image (e.g., based on one or more other test images taken with the camera) to determine the dynamic range. In one use case, camera settings subsystem 128 takes the max pixel value of the test image and subtracts the minimum pixel value of the test image to determine the maximum dynamic range. Camera settings subsystem 128 may then compare the maximum dynamic range against sensor performance data associated with the camera to determine one or more camera settings thresholds (e.g., a minimum ISO to capture all or substantially all the dynamic range in a scene or other camera setting thresholds). As an example, the sensor performance data may indicate test information on many different camera sensors, the dynamic ranges, color ranges, or other ranges that the respective sensors can resolve at different ISOs or other settings. Camera settings subsystem 128 may compare the data on the number of stops (that can be captured at each ISO) with the gamma-corrected dynamic range value to determine a minimum ISO for a shot.

In some embodiments, camera settings subsystem 128 may obtain one or more images (e.g., test images near the time a shot is taken) and determine a color range based on the images. As an example, camera settings subsystem 128 may apply a gamma correction to a test image (e.g., based on one or more other test images taken with the camera) to determine the color range. In one use case, camera settings subsystem 128 takes the max pixel value of the test image and subtracts the minimum pixel value of the test image to determine the maximum color range. Camera settings subsystem 128 may then compare the maximum color range against sensor performance data associated with the camera to determine one or more camera settings thresholds (e.g., a minimum ISO to capture all or substantially all the dynamic range in a scene or other camera setting thresholds).

In some embodiments, camera settings subsystem 128 may obtain one or more images (e.g., test images near the time a shot is taken) and determine a depth of field range of the images. As an example, camera settings subsystem 128 may determine the depth of field by computing the distance between the nearest and farthest objects in a scene that appears acceptably sharp in a test image. In one use case, a user interface on the camera, an accessory to the camera, or another user device may enable a user to select which object(s) or areas(s) in a scene to focus on or to get the whole scene in focus. Based on such selection (e.g., the selected objects or areas), camera settings subsystem 128 may determine the depth of field for a shot. In some embodiments, a neural network (or other machine learning model) may be trained to estimate depth of field of an image, and a test image may be provided to the trained neural network to obtain an estimation of the depth of field of the test image from the trained neural network. In some embodiments, the neural network may be trained to output a depth map indicating depth of one or more objects in an image, and the test image may be provided to the trained neural network to obtain a depth map for the test image from the trained neural network (e.g., a depth map that indicates depth of one or more objects in the test image).

In some embodiments, camera settings subsystem 128 may obtain one or more images (e.g., test images near the time a shot is taken) and determine one or more noise profiles based on the images. As an example, camera settings subsystem 128 may determine an amount of noise in a test image and compare the amount of noise against sensor performance data to determine a noise profile to take into an account for taking a shot. Such sensor performance data may include data on how noise changes as ISO changes for one or more sensors, how noise changes as incoming light changes for such sensors, or other information for different sensors.

In some embodiments, camera settings subsystem 128 may obtain one or more lens sharpness profiles from one or more sources. As an example, camera settings subsystem 128 may select a lens sharpness profile to obtain from a source based on a lens associated with the camera being used to take the desired shot. Based on the selected lens sharpness profile, camera settings subsystem 128 may determine an aperture threshold (or other camera setting thresholds).

In some embodiments, camera settings subsystem 128 may assign different weights to different conditions to determine camera settings for an environment. As an example, the condition information and the weights may be provided as parameters to a weighted constraint solver algorithm to determine the optimal settings for a shot. In one use case, for example, the weights for each condition may include the following: (i) vibration—maintain priority, (ii) Subject Motion—ignore if clustered shutter speeds>2× current subject motion minimum shutter speed, (iii) dynamic range—high priority if calculated dynamic range is near sensor's dynamic range, low priority if dynamic range is above, (iv)

depth of field—high priority if the user choose multiple focus points, (v) noise profiles—fixed priority, (vi) lens sharpness profiles—fixed priority, or (vii) other weights.

Model Training Via Reference Feedback

In some embodiments, model management subsystem 114 may enable one or more prediction models to be trained. Training data used to train the prediction models may include (i) inputs to be provided to a prediction model (e.g., inputs provided to and processed by other prediction or other inputs), (ii) reference outputs that are to be derived from a prediction model's processing of such inputs (e.g., user-confirmed or user-provided outputs, outputs confirmed through one or more prediction models' processing of such inputs, outputs confirmed multiple times by processing of such inputs by respective sets of prediction models, or other reference outputs), (iii) reference indications of outputs that are not to be derived from a machine learning model's processing of such inputs (e.g., user indications that such outputs are inaccurate or other reference indications), or (iv) other training data.

In some embodiments, upon obtaining a set of content items, model management subsystem 114 may cause a prediction model to generate predictions related to mapping of the content items (or portions thereof) into a vector space (e.g., predictions with respect to a single vector for each content item, multiple vectors for each content item, locations within the vector space onto which the content items are to be mapped, etc.). Model management subsystem 114 may analyze those predictions against a set of reference feedback (e.g., obtained by feedback subsystem 116), such as reference predictions of a single vector for each content item, multiple vectors for each content item, locations within the vector space onto which the content items are to be mapped, or other desired outputs for use as a reference. In one use case, the reference outputs may be provided as input to the prediction model (e.g., prior to, simultaneously with, or subsequent to providing the content items to the prediction model), which the prediction model may utilize to determine whether its predictions are accurate, determine the level of accuracy or completeness with respect to each prediction, or other make other determinations (e.g., via deep learning through its multiple layers of abstraction or other techniques). Such determinations may be utilized by the prediction model to improve the accuracy or completeness of its mapping predictions. In another use case, accuracy or completeness indications with respect to the prediction model's predictions (e.g., whether a given prediction is accurate, how accurate or complete a given prediction is, etc.) may be provided to the prediction model, which, in turn, may utilize the accuracy or completeness indications to improve the accuracy or completeness of its mapping predictions.

In some embodiments, model management subsystem 114 may provide content items (e.g., audio, images, videos, or other content items) to one or more prediction models to cause the prediction models to generate feature vectors representing the content items. As an example, such feature vectors may indicate locations within a vector space or may be used to predict the locations) or other location-related predictions. As an example, each of the locations/location predictions being a location to which at least a portion of a content item of the content items is predicted to correspond. Feedback subsystem 116 may obtain a reference feedback set, and model management subsystem 114 may cause the prediction models to be updated based on the location predictions and the reference feedback set. As an example, the reference feedback set include reference vectors or locations with respect to the vector space, and each of the reference vectors or locations may be a location to which at least a portion of a content item of the content items is confirmed to correspond. Model management subsystem 114 may cause the prediction models to be updated by providing respective reference vectors/locations to the prediction models to cause the prediction models to be updated based on the respective reference vectors/locations. As an example, a prediction model may determine similarities or differences between the location predictions and their corresponding reference vectors/locations and updates itself based on the determined similarities or differences (e.g., by learning how to arrive at a correct prediction that is the same or similar to the reference vectors/locations).

In some embodiments, model management subsystem 114 may provide a collection of images to a prediction model as input to the prediction model for performing classification prediction (e.g., identification of one or more concepts in each of the images, classification of each image into one or more categories, etc.). As an example, the prediction model may include a neural network or other machine learning model (or other prediction model). The prediction model may, for example, include three or more layers (e.g., an input layer, an output layer, and one or more intermediate layers), one of which to which the images may be provided as input, another of which may provide predicted classifications as the prediction model's output, etc. Other layers may include a layer that outputs a feature vector (e.g., representing an inputted image) for processing by a layer (or set of layers) that processes the feature vector and outputs one or more predicted classifications (e.g., of the inputted image). In some embodiments, feedback subsystem 116 may provide reference feedback to the prediction model for the prediction model to update its classification predictions. As an example, the reference feedback may include (i) user-confirmed or user-provided classifications of one or more of the images (provided as input for the prediction model to classify), (ii) user indications that the prediction model's predicted classifications are inaccurate, or (iii) other reference feedback. The reference feedback may be provided as input to the prediction model (e.g., prior to, simultaneously with, or subsequent to providing the respective images to the prediction model), which the prediction model may utilize to determine whether its predictions are accurate, determine the level of accuracy or completeness with respect to each prediction, or other make other determinations (e.g., via deep learning through its multiple layers of abstraction or other techniques). Such determinations may be utilized by the prediction model to improve the accuracy or completeness of its predictions.

In some embodiments, a prediction model trained to accurately such classification of images may be modified to provide a feature vector as at least part of the prediction model's output. In some embodiments, where a given layer of the prediction model provides one or more predicted classifications as the prediction model's output, model management subsystem 114 may modify the prediction model such that a feature vector outputted by another layer of the prediction model may be provided as at least part of the prediction model's output. As a further example, the given layer may initially be the output layer of the prediction model, and the given layer may be removed from the prediction model so that the layer immediately preceding the given layer becomes the output layer. The layer that outputs a feature vector (e.g., representing an inputted image) may, for example, become the output layer of the prediction model upon removal of the prior output layer. Model management subsystem 114 may store the modified prediction model (e.g., to determine feature vectors of a test image or other operations related to camera settings configuration for image capture or with other device settings configurations). As an example, the modified prediction model may take an image as input and provide a feature vector (e.g., representing the image) as output. As another example, the modified prediction model may be provided to or used by one or more user devices (e.g., one or more cameras, accessories to the cameras, or other user devices) to transform captured images (e.g., test frames or other images) into feature vectors that accurately reflect such captured images.

Examples Flowcharts

Figure 4:
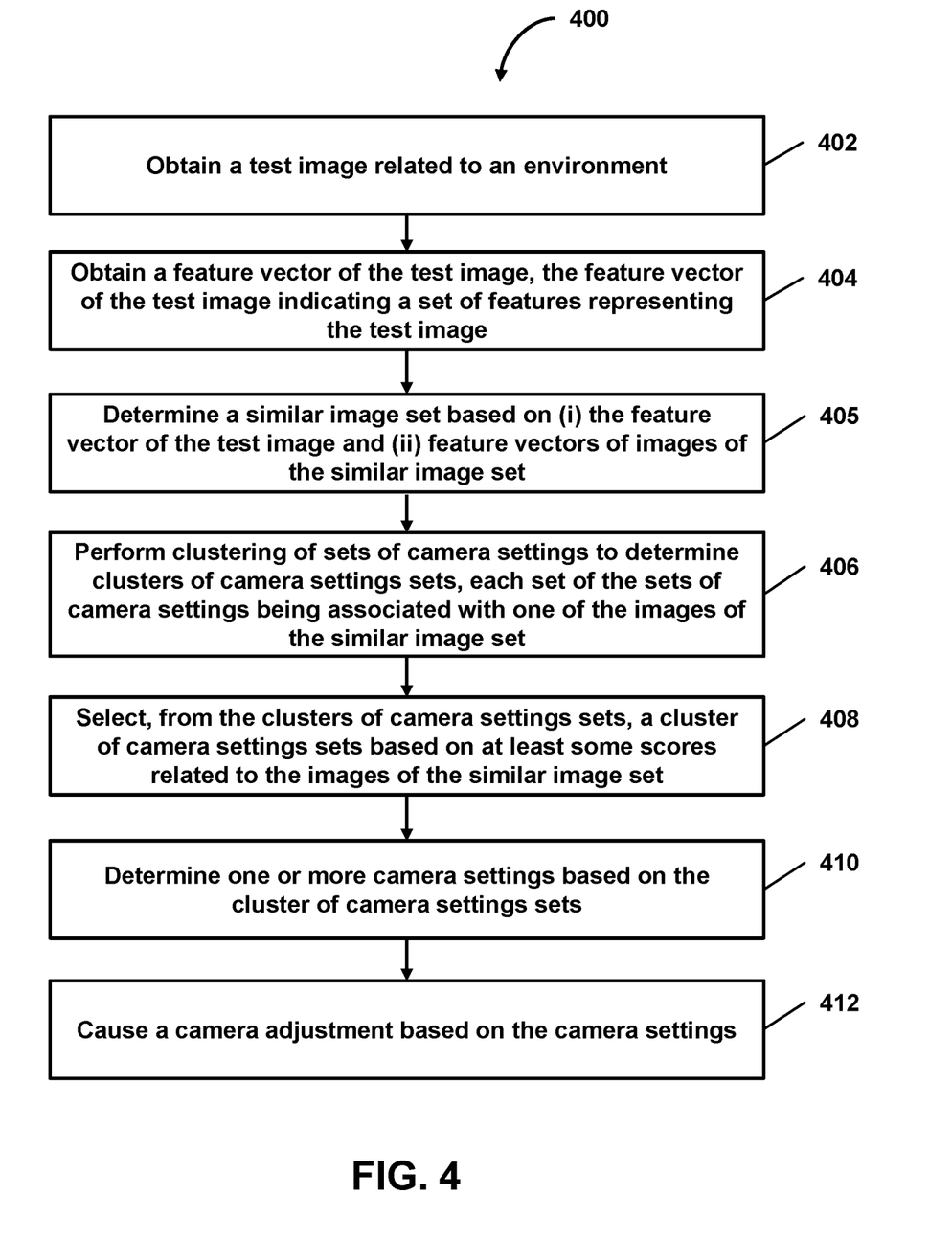
FIG. 4 shows a flowchart of a method of facilitating automatic camera settings configuration for image capture, in accordance with one or more embodiments
Figure 5:
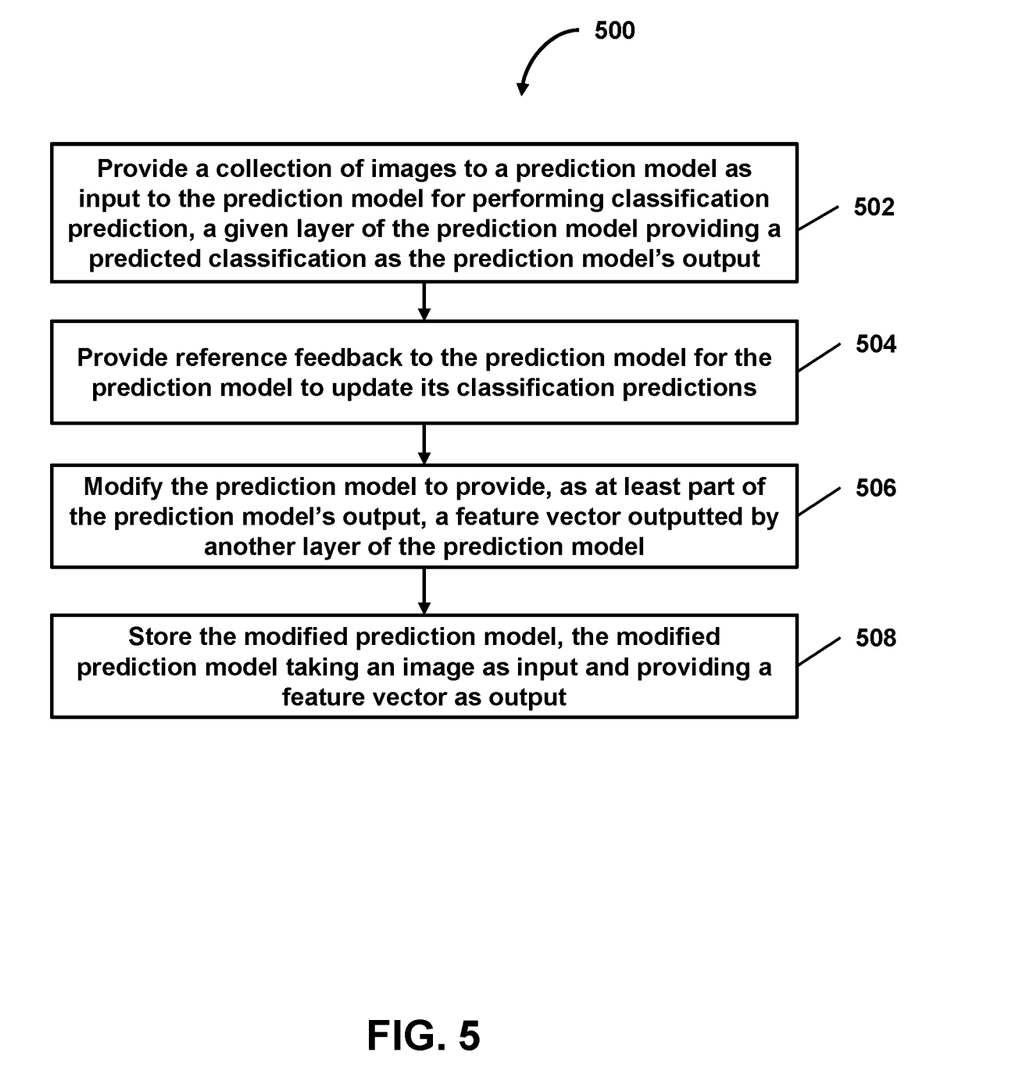
FIG. 5 shows a flowchart of a method of generating a prediction model for use in facilitating device settings configuration for capturing data, in accordance with one or more embodiments.

FIGS. 4 and 5 are example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 4 shows a flowchart of a method 400 of facilitating automatic camera settings configuration for image capture, in accordance with one or more embodiments.

In an operation 402, a test image related to an environment may be obtained. As an example, the test image may be related to an environment of a camera, a camera accessory device, or a user of the camera or the camera accessory device. In one use case, the test image may include an image of at least part of the environment in which the camera, the camera accessory device, or the user is located. As an example, the test image may be read via a sensor (e.g., of a camera, a camera accessory device, or other device) within a given time period of a user input associated with an image capture command. A camera or camera accessory device may, for example, capture one or more test images (i) on a periodic basis (e.g., every 10 nanoseconds, every 100 nanoseconds, every millisecond, every 10 milliseconds, every 100 milliseconds, or other time interval), (ii) in accordance with a schedule, or (iii) based on one or more automated triggers. As an example, one or more test images may be captured in response to (i) detection of the camera or camera accessory device being powered on or being switched to an active capturing mode (e.g., an active image capturing mode, an active video capturing mode, etc.), (ii) detection of a user input associated with a capture command such that a responsive test image is performed prior to the user-intended image capture, (iii) detection of the camera or camera accessory device's movement satisfying a predetermined movement threshold (e.g., no detectable movement, at or below the predetermined movement threshold, etc.), (iv) detection of increase or decrease of acceleration of the camera or camera accessory device satisfying a predetermined increase/decrease acceleration threshold (e.g., detecting sudden increase or decrease in such acceleration), or (v) other automated triggers. Operation 402 may be performed by a data capture subsystem that is the same as or similar to data capture subsystem 122, in accordance with one or more embodiments.

In an operation 404, a feature vector of the test image may be obtained. As an example, the feature vector of the test image may indicate a set of features representing the test image. As another example, the set of features may be extracted by a neural network or other prediction model to obtain the feature vector of the test image. Operation 404 may be performed by a model subsystem that is the same as or similar to model subsystem 124, in accordance with one or more embodiments.

In an operation 405, a similar image set may be determined based on (i) the feature vector of the test image and (ii) feature vectors of images of the similar image set. As an example, a nearest neighbor algorithm (or other technique) may be performed with respect to a large collection of images or their image representations to determine the set of image representations of images similar to the test image. Operation 406 may be performed by a feature processing subsystem that is the same as or similar to feature processing subsystem 126, in accordance with one or more embodiments.

In an operation 406, clustering of sets of camera settings may be performed based on the feature vector of the test image to determine clusters of camera settings sets. Operation 406 may be performed by a feature processing subsystem that is the same as or similar to feature processing subsystem 126, in accordance with one or more embodiments.

In an operation 408, a cluster of camera settings sets may be selected from the clusters of camera settings sets based on scores related to the images similar to the test image (e.g., scores related to the similar images associated with camera settings sets of the cluster, scores related to one or more other similar images of the similar image set, etc.). As an example, the scores related to the similar images or their associated camera settings sets of each of the clusters may be averaged to generate an average score for each of the clusters. The cluster with the highest average score may be selected. Operation 408 may be performed by a camera settings subsystem that is the same as or similar to camera settings subsystem 128, in accordance with one or more embodiments.

In an operation 410, one or more camera settings may be determined based on the cluster of camera settings sets. As an example, the camera settings may be determined based on an averaging the cluster of camera settings sets. As another example, "base settings" may be determined by averaging the cluster of camera settings sets, and the base settings may be adjusted based on one or more environmental conditions or other criteria to determine the camera settings. Operation 410 may be performed by a camera settings subsystem that is the same as or similar to camera settings subsystem 128, in accordance with one or more embodiments.

In an operation 412, a camera adjustment may be caused based on the camera settings. As an example, the camera adjustment may be performed based on the camera settings within less than a few seconds of a user input associated with an image capture command (e.g., less than one second, less than two seconds, less than three seconds, etc., of the user input). Operation 412 may be performed by a camera settings subsystem that is the same as or similar to camera settings subsystem 128, in accordance with one or more embodiments.

FIG. 5 shows a flowchart of a method of generating a prediction model for use in facilitating device settings configuration for capturing data, in accordance with one or more embodiments.

In an operation 502, a collection of images may be provided to a prediction model as input to the prediction model for performing classification prediction (e.g., identification of one or more concepts in each of the images, classification of each image into one or more categories, etc.). As an example, the prediction model may include a neural network or other machine learning model (or other prediction model). The prediction model may, for example, include three or more layers (e.g., an input layer, an output layer, and one or more intermediate layers), one of which to which the images may be provided as input, another of which may provide predicted classifications as the prediction model's output, etc. Other layers may include a layer that outputs a feature vector (e.g., representing an inputted image) for processing by a layer (or set of layers) that processes the feature vector and outputs one or more predicted classifications (e.g., of the inputted image). Operation 502 may be performed by a model management subsystem that is the same as or similar to model management subsystem 114, in accordance with one or more embodiments.

In an operation 504, reference feedback may be provided to the prediction model for the prediction model to update its classification predictions. As an example, the reference feedback may include (i) user-confirmed or user-provided classifications of one or more of the images (provided as input for the prediction model to classify), (ii) user indications that the prediction model's predicted classifications are inaccurate, or (iii) other reference feedback. The reference feedback may be provided as input to the prediction model (e.g., prior to, simultaneously with, or subsequent to providing the respective images to the prediction model), which the prediction model may utilize to determine whether its predictions are accurate, determine the level of accuracy or completeness with respect to each prediction, or other make other determinations (e.g., via deep learning through its multiple layers of abstraction or other techniques). Such determinations may be utilized by the prediction model to improve the accuracy or completeness of its predictions. Operation 504 may be performed by a feedback subsystem that is the same as or similar to feedback subsystem 116, in accordance with one or more embodiments.

In an operation 506, the prediction model may be modified to provide a feature vector as at least part of the prediction model's output. As an example, where a given layer of the prediction model provides one or more predicted classifications as the prediction model's output, the prediction model may be modified such that a feature vector outputted by another layer of the prediction model may be provided as at least part of the prediction model's output. As a further example, the given layer may initially be the output layer of the prediction model, and the given layer may be removed from the prediction model so that the layer immediately preceding the given layer becomes the output layer. The layer that outputs a feature vector (e.g., representing an inputted image) may, for example, become the output layer of the prediction model upon removal of the prior output layer. Operation 506 may be performed by a model management subsystem that is the same as or similar to model management subsystem 114, in accordance with one or more embodiments.

In an operation 508, the modified prediction model may be stored (e.g., for use with camera settings configuration for image capture or with other device settings configurations). As an example, the modified prediction model may take an image as input and provide a feature vector (e.g., representing the image) as output. Operation 508 may be performed by a model management subsystem that is the same as or similar to model management subsystem 114, in accordance with one or more embodiments.

In some embodiments, the various computers and subsystems illustrated in FIG. 1 may include one or more computing devices that are programmed to perform the functions described herein. The computing devices may include one or more electronic storages (e.g., prediction database(s) 132, which may include training data database(s) 134, model database(s) 136, vector database(s) 138, etc., or other electric storages), one or more physical processors programmed with one or more computer program instructions, and/or other components. The computing devices may include communication lines or ports to enable the exchange of information with a network (e.g., network 150) or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The electronic storage media of the electronic storages may include one or both of (i) system storage that is provided integrally (e.g., substantially non-removable) with servers or user devices or (ii) removable storage that is removably connectable to the servers or user devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from user devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-128 or other subsystems. The processors may be programmed to execute computer program instructions by software; hardware; firmware;

some combination of software, hardware, or firmware; and/or other mechanisms for configuring processing capabilities on the processors.

It should be appreciated that the description of the functionality provided by the different subsystems 112-128 described herein is for illustrative purposes, and is not intended to be limiting, as any of subsystems 112-128 may provide more or less functionality than is described. For example, one or more of subsystems 112-128 may be eliminated, and some or all of its functionality may be provided by other ones of subsystems 112-128. As another example, additional subsystems may be programmed to perform some or all of the functionality attributed herein to one of subsystems 112-128.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

A1. A user device comprising a camera or camera accessory device, the camera or camera accessory device comprising: a housing; one or more computer-readable media, within the housing, configured to store (i) a neural network trained on 10,000 or more images that collectively are associated with 100 or more image categories and (ii) a collection of 1000 or more image representations, 1000 or more cluster of camera settings sets, and 1000 or more scores related to camera settings sets; one or more processors within the housing, the processors executing computer program instructions that, when executed, cause the processors to: obtain, via the neural network, an image representation of a test image related to an environment of the camera or camera accessory device, the image representation of the test image comprising a set of features representing the test image; perform, based on the image representation of the test image, clustering of sets of camera settings stored in the computer-readable media of the camera or camera accessory device to determine clusters of camera settings sets, each set of the sets of camera settings being associated with an image similar to the test image; select, from the clusters of camera settings sets, a cluster of camera settings sets based on scores related to the images similar to the test image that are associated with camera settings sets of the cluster; determine environment-specific camera settings with respect to the environment based on the cluster of camera settings sets; and cause a camera adjustment based on the environment-specific camera settings within less than one second of the determination of the environment-specific camera settings.

A2. The user device of embodiment A1, wherein the processors are caused to: detect a user input associated with an image capture command; and determine, within less than one second of the detection of the user input, the environment-specific camera settings with respect to the environment based on the cluster of camera settings sets, wherein an image capture is performed by a camera based on the user input and the camera adjustment to capture an image.

A3. The user device of embodiment A2, wherein the processors are caused to: cause the camera adjustment based on the environment-specific camera settings such that the camera adjustment occurs within less than one second of the detection of the user input.

A4. The user device of any of embodiments A2-A3, wherein the processors are caused to: read the test image via a sensor within less than one second of the detection of the user input to obtain the test image; and extract, via the neural network, the set of features from the test image to obtain the image representation of the test image.

A5. The user device of any of embodiments A2-A4, wherein the processors are caused to: determine, via a sensor, an amount of vibration having an effect on the camera, the amount of vibration being vibration having an effect on the camera within less than one second of the detection of the user input; and determine, within less than one second of the detection of the user input, the environment-specific camera settings with respect to the environment based on (i) the cluster of camera settings sets and (ii) the amount of vibration.

A6. The user device of any of embodiments A2-A5, wherein the processors are caused to: detect a subject of the image to be captured; determine an amount of motion of the subject, the amount of motion being motion of the subject that occurs within less than one second of the detection of the user input; and determine, within less than one second of the detection of the user input, the environment-specific camera settings with respect to the environment based on (i) the cluster of camera settings sets and (ii) the amount of motion.

A7. The user device of any of embodiments A2-A6, wherein the processors are caused to: determine a dynamic range of one or more test images captured within less than one second of the detection of the user input; compare the dynamic range against sensor performance data associated with the camera to determine one or more camera settings thresholds; and determine, within less than one second of the detection of the user input, the environment-specific camera settings with respect to the environment based on (i) the cluster of camera settings sets and (ii) the camera settings thresholds.

A8. The user device of any of embodiments A2-A7, wherein the processors are caused to: determine a color range derived from one or more test images captured within less than one second of the detection of the user input, a depth of field from the test images, a noise profile derived from the test images, a lens sharpness profile derived from the test images, or a circle of confusion derived from the test images; and determine, within less than one second of the detection of the user input, the environment-specific camera settings with respect to the environment based on (i) the cluster of camera settings sets and (ii) the color range, the depth of field, the noise profile, the lens sharpness profile, or the circle of confusion.

A9. The user device of any of embodiments A1-A8, wherein the 10,000 or more images includes the images similar to the test image such that the images were used to train the neural network.

A10. The user device of any of embodiments A1-A9, wherein the 1000 or more image representations includes 1000 or more feature vectors, the image representation of the test image includes a feature vector indicating a set of features representing the test image, and the camera settings sets of the selected cluster includes camera settings sets that each indicate camera settings related to an image similar to the test image.

A11. The user device of any of embodiments A1-10, wherein the camera or camera accessory device is a camera accessory device, and the camera accessory device comprises the housing, the computer-readable media, and the processors.

A12. The user device of any of embodiments A1-10, wherein the camera or camera accessory device is a camera, and the camera comprises the housing, the computer-readable media, and the processors.

B1. A method comprising: obtaining an image representation of a test image related to an environment of a camera or camera accessory device, the image representation comprising a set of features representing the test image; determining, based on the image representation of the test image, a cluster of camera settings sets, each set of the camera settings sets being associated with an image similar to the test image; determining environment-specific camera settings with respect to the environment based on the cluster of camera settings sets; and causing a camera adjustment based on the environment-specific camera settings.

B2. The method of embodiment B1, further comprising: detecting a user input associated with an image capture command; and determining, within less than one second of the detection of the user input, the environment-specific camera settings with respect to the environment based on the cluster of camera settings sets, wherein an image capture is performed by a camera based on the user input and the camera adjustment to capture an image.

B3. The method of embodiment B2, further comprising: causing the camera adjustment based on the environment-specific camera settings such that the camera adjustment occurs within less than one second of the detection of the user input.

B4. The method of any of embodiments B2-B3, further comprising: reading the test image via a sensor within less than one second of the detection of the user input to obtain the test image; and extracting, via the prediction model, the set of features from the test image to obtain the image representation of the test image.

B5. The method of any of embodiments B2-B4, further comprising: determining, via a sensor, an amount of vibration having an effect on the camera, the amount of vibration being vibration having an effect on the camera within less than one second of the detection of the user input; and determining, within less than one second of the detection of the user input, the environment-specific camera settings with respect to the environment based on (i) the cluster of camera settings sets and (ii) the amount of vibration.

B6. The method of any of embodiments B2-B5, further comprising: detecting a subject of the image to be captured; determining an amount of motion of the subject, the amount of motion being motion of the subject that occurs within less than one second of the detection of the user input; and determining, within less than one second of the detection of the user input, the environment-specific camera settings with respect to the environment based on (i) the cluster of camera settings sets and (ii) the amount of motion.

B7. The method of any of embodiments B2-B6, further comprising: determining a dynamic range of one or more test images captured within less than one second of the detection of the user input; comparing the dynamic range against sensor performance data associated with the camera to determine one or more camera settings thresholds; and determining, within less than one second of the detection of the user input, the environment-specific camera settings with respect to the environment based on (i) the cluster of camera settings sets and (ii) the camera settings thresholds.

A8. The method of any of embodiments B2-B7, further comprising: determining a color range derived from one or more test images captured within less than one second of the detection of the user input, a depth of field from the test images, a noise profile derived from the test images, a lens sharpness profile derived from the test images, or a circle of confusion derived from the test images; and determining, within less than one second of the detection of the user input, the environment-specific camera settings with respect to the environment based on (i) the cluster of camera settings sets and (ii) the color range, the depth of field, the noise profile, the lens sharpness profile, or the circle of confusion.

B9. The method of embodiment B1-B8, further comprising: obtaining, via a prediction model, the image representation of the test image.

B10. The method of embodiment B9, wherein the prediction model comprises a neural network trained on 10,000 or more images that collectively are associated with 100 or more image categories.

B11. The method of embodiment B10, wherein the 10,000 or more images includes the images similar to the test image such that the images were used to train the neural network.

B12. The method of any of embodiments B1-B11, wherein the image representation of the test image includes a feature vector indicating a set of features representing the test image.

B13. The method of any of embodiments B1-B12, wherein the cluster of camera settings sets is obtained from one or more computer-readable media of the camera or camera accessory device.

B14. The method of any of embodiments B1-B13, wherein the image representations of the images similar to the test image are stored on one or more computer-readable media of the camera or camera accessory device.

C1. A tangible, non-transitory, machine-readable medium storing instructions that when executed by a data processing apparatus cause the data processing apparatus to perform operations comprising those of any of embodiments B1-B14.

D1. A user device comprising: one or more processors; and memory storing instructions that when executed by the processors cause the processors to effectuate operations comprising those of any of embodiments B1-B14.

E1. A system comprising: one or more processors; and memory storing instructions that when executed by the processors cause the processors to effectuate operations comprising those of any of embodiments B1-B14.

What is claimed is:

1. A user device for facilitating automatic camera settings configuration for image capture, the user device comprising a camera or camera accessory device, the camera or camera accessory device comprising:
   one or more processors executing computer program instructions that, when executed, cause the one or more processors to:
   obtain a feature vector of a test image related to an environment of the camera or camera accessory device, the feature vector of the test image indicating a set of features representing the test image;
   determine a cluster of camera settings sets based on the feature vector of the test image, each camera settings set of the cluster being associated with an image similar to the test image;
   determine environment-specific camera settings based on the cluster of camera settings sets; and
   cause, based on the environment-specific camera settings, a camera adjustment to the camera or camera accessory device within less than one second of the determination of the environment-specific camera settings.

2. The user device of claim 1, wherein the one or more processors are caused to:
    detect a user input associated with an image capture command; and
    determine, within less than one second of the detection of the user input, the environment-specific camera settings based on the cluster of camera settings sets,
    wherein an image capture is performed by a camera based on the user input and the camera adjustment to capture an image.

3. The user device of claim 2, wherein the one or more processors are caused to:
    cause the camera adjustment based on the environment-specific camera settings such that the camera adjustment occurs within less than one second of the detection of the user input.

4. The user device of claim 2, wherein the one or more processors are caused to:
    read the test image via a sensor within less than one second of the detection of the user input to obtain the test image; and
    extract the set of features from the test image to obtain the feature vector of the test image.

5. The user device of claim 2, wherein the one or more processors are caused to:
    determine, via a sensor, an amount of vibration having an effect on the camera, the amount of vibration being vibration having an effect on the camera within less than one second of the detection of the user input; and
    determine, within less than one second of the detection of the user input, the environment-specific camera settings with respect to the environment based on (i) the cluster of camera settings sets and (ii) the amount of vibration.

6. The user device of claim 2, wherein the one or more processors are caused to:
    detect a subject of the image to be captured;
    determine an amount of motion of the subject, the amount of motion being motion of the subject that occurs within less than one second of the detection of the user input; and
    determine, within less than one second of the detection of the user input, the environment-specific camera settings with respect to the environment based on (i) the cluster of camera settings sets and (ii) the amount of motion.

7. The user device of claim 1, wherein the camera or camera accessory device is a camera accessory device, and the camera accessory device comprises the one or more processors.

8. The user device of claim 1, wherein the camera or camera accessory device is a camera, and the camera comprises the one or more processors.

9. The user device of claim 1, wherein the one or more processors are caused to:
    perform, based on the feature vector of the test image, clustering of sets of camera settings stored on the camera or camera accessory device to determine clusters of camera settings sets,
    wherein determining the cluster of camera settings sets comprises selecting, from the clusters of camera settings sets, the cluster of camera settings sets based on scores related to the images similar to the test image that are associated with camera settings sets of the cluster.

10. A method being implemented by one or more processors executing computer program instructions that, when executed, perform the method, the method comprising:
    obtaining an image representation of a test image related to an environment of a camera or camera accessory device, the image representation comprising a set of features representing the test image;
    determining a cluster of camera settings sets based on the image representation of the test image, each camera settings set of the cluster being associated with an image similar to the test image;
    detecting a user input associated with an image capture command; and
    determining, within less than one second of the detection of the user input, camera settings with respect to the environment based on the cluster of camera settings sets; and
    causing, based on the camera settings, a camera adjustment to the camera or camera accessory device,
    wherein an image capture is performed by a camera based on the user input and the camera adjustment to capture an image.

11. The method of claim 10, further comprising:
    causing the camera adjustment based on the camera settings such that the camera adjustment occurs within less than one second of the detection of the user input.

12. The method of claim 10, further comprising:
    reading the test image via a sensor within less than one second of the detection of the user input to obtain the test image; and
    extracting the set of features from the test image to obtain the image representation of the test image.

13. The method of claim 10, further comprising:
    determining, via a sensor, an amount of vibration having an effect on the camera, the amount of vibration being vibration having an effect on the camera within less than one second of the detection of the user input; and
    determining, within less than one second of the detection of the user input, the camera settings with respect to the environment based on (i) the cluster of camera settings sets and (ii) the amount of vibration.

14. The method of claim 10, further comprising:
    detecting a subject of the image to be captured;
    determining an amount of motion of the subject, the amount of motion being motion of the subject that occurs within less than one second of the detection of the user input; and
    determining, within less than one second of the detection of the user input, the camera settings with respect to the environment based on (i) the cluster of camera settings sets and (ii) the amount of motion.

15. One or more non-transitory machine-readable media storing instructions that, when executed by one or more processors, cause operations comprising:
    obtaining an image representation of a test image related to an environment, the image representation comprising a set of features representing the test image;
    determining a cluster of camera settings sets based on the image representation of the test image, each camera settings set of the cluster being associated with an image similar to the test image;
    detecting a user input associated with an image capture command;
    determining, within less than one second of the detection of the user input, camera settings with respect to the environment based on the cluster of camera settings sets; and causing a camera adjustment to a camera or camera accessory device based on the camera settings such that the camera adjustment occurs within less than one second of the detection of the user input, wherein an image capture is performed by a camera based on the user input and the camera adjustment to capture an image.

16. The one or more non-transitory machine-readable media of claim 15, wherein the operations further comprise:

determining, via a sensor, an amount of vibration having an effect on the camera, the amount of vibration being vibration having an effect on the camera within less than one second of the detection of the user input; and determining, within less than one second of the detection of the user input, the camera settings with respect to the environment based on (i) the cluster of camera settings sets and (ii) the amount of vibration.

17. The one or more non-transitory machine-readable media of claim 15, wherein the operations further comprise:

detecting a subject of the image to be captured;

determining an amount of motion of the subject, the amount of motion being motion of the subject that occurs within less than one second of the detection of the user input; and determining, within less than one second of the detection of the user input, the camera settings with respect to the environment based on (i) the cluster of camera settings sets and (ii) the amount of motion.

18. The one or more non-transitory machine-readable media of claim 15, wherein the operations further comprise:

performing, based on the image representation of the test image, clustering of sets of camera settings to determine clusters of camera settings sets, wherein determining the cluster of camera settings sets comprises selecting, from the clusters of camera settings sets, the cluster of camera settings sets based on scores related to the images similar to the test image that are associated with camera settings sets of the cluster.

\* \* \* \* \*